Patented Aug. 18, 1953

2,649,398

UNITED STATES PATENT OFFICE 2,649,398

DOUCHE COMPOSITION

John H. Wright, Clearwater, Fla., and Albert W. Lewing, Monson, Mass., assignors to Tampax, Incorporated, New York, N. Y., a corporation of Delaware No Drawing. Application April 1, 1949, Serial No. 85,025

5 Claims. (Cl. 167—58)

This invention relates to compositions adapted to be used for treating the surfaces of mucous membranes of the human body and more particularly to compositions that may be advantageously incorporated in or used as a douche. The present compositions may be solids adapted to be dissolved in water to form a douche, or relatively concentrated solutions that must be diluted before use, or solutions that are sufficiently dilute so that they may be used without further dilution. This application is a continuation-in-part of our prior application Serial No. 729,676, filed February 19, 1947, now abandoned. Douche compositions similar to those of the present application and containing alkylated aryl polyether alcohol as a wetting agent are disclosed and claimed in our companion application Serial No. 85,026 filed on April 1, 1949, Patent No. 2,556,567, dated June 12, 1951.

As pointed out in our prior application, it is desirable that a douche for general douching purposes have an effective cleansing action on the vaginal surfaces, that it be mildly astringent and that it have an acidity approximating that of the normal vagina, i. e., a pH between 3.0 and 6.0 and preferably between 4.0 and 5.0. An alkaline douche is objectionable in that it interferes with the natural reaction of the vaginal tract and disturbs the development of a normal bacterial flora which is generally considered essential to the maintenance of a healthy condition. Hence it is important that the composition used in preparing the douche be capable of establishing and maintaining a desired acidity of the douche solution. Also it is important that the douche solution be free from components which would destroy, for example, the so-called Doderlein bacilli which are normally and desirably present in the vagina. It is also desirable that the components be non-toxic and free from irritating and other deleterious properties and that they be chemically and physically stable so that the composition may be stored over a relatively long period of time without deteriorating.

It is accordingly an object of the present invention to provide a mildly acid, mildly astringent, and effectively detergent solution for treating exposed or readily accessible mucous membrane surfaces. It is another object of the invention to provide a solid composition that is adapted to be dissolved in a suitable medium such as water to form a solution of this type that is especially adapted to be used as a douche for cleansing vaginal surfaces. It is still another object of the invention to provide a finely divided, dry, solid composition of this character that when dissolved in water forms a clear solution and is capable of establishing and maintaining a desired acidity, i. e., a pH of the order of 4.0 to 5.0. It is a further object of the invention to provide a douche solution of this type that is free from components which would destroy the Doderlein bacilli normally present in the vagina. It is a still further object of the invention to provide a douche that is non-toxic, completely free from irritating and deleterious components and that has a beneficial effect on vaginal surfaces with which it comes in contact. Other objects of the invention will be in part obvious and in part pointed out hereafter.

We have found that the objects of the present invention may be achieved in general by providing a composition comprising a non-toxic, water-soluble astringent selected from the group consisting of aluminum and zinc salts and a wetting agent that is compatible with the astringent in water solution. Although certain of the salts of metals other than zinc and aluminum exhibit an astringent action, it has been found that the zinc and aluminum and more particularly the sulfates of these metals have an astringent action that is especially favorable in compositions of the present type. In order to provide an effective cleansing action, we prefer to use a wetting agent, i. e., one of the so-called "soapless detergents" as distinguished from an ordinary soap. While soaps are effective cleansing agents for this purpose, they are objectionable in that they are normally alkaline and hence tend to alter the normally acid condition of the vagina. Moreover, they lose their effectiveness when incorporated in acid solution and are incompatible with solutions of zinc and aluminum salts, that is to say, they are precipitated by zinc and aluminum salts in acid solution.

We have found that a douche incorporating a suitable astringent and wetting agent as described hereafter, provides an unusually effective cleansing of the vaginal surfaces. Such surfaces normally have a mucous layer which is substantially impermeable to most aqueous solutions. The astringent of the present douche operates to coagulate or clot this mucous layer thus permitting the wetting agent to reach and cleanse the underlying surfaces. Hence the astringent and wetting agent cooperate to give a detergent action that cannot be achieved with either component alone.

In order to prevent destruction of the Doderlein bacilli the wetting agent used in the present composition is preferably non-germicidal. We have found that the suitability of a wetting agent for use in the present douche composition can be determined by subjecting the wetting agent to a standard germicidal test against *Staph. aureus,* as described for example in "U. S. Food and Drug Administration Methods of Testing Antiseptics and Disinfectants" in U. S. Department of Agriculture's circular No. 198 (December 1931). Wetting agents which when tested according to this procedure in aqueous solution are found to be non-germicidal against *Staph. aureus* at a dilution of 1:200 are suitable for use in the present douche. The term "non-germicidal" as used in the present specification and claims is intended to designate wetting agents which satisfy this test, that is, wetting agents which at a dilution of 1:200 in water are non-germicidal toward *Staph. aureus* under the prescribed test conditions. Examples of non-germicidal wetting agents are sodium lorolsulfoacetate, which may be for example the material sold under the tradename Nacconol, and lorolalkyl metasodium sulfobenzoate, which may be the material sold under the trade-name Santomerse B.

The relative proportions of astringent and wetting agent are determined in some measure by the concentration desired in the douche solution when ready for use. The compatibility of the wetting agent and astringent varies somewhat according to the particular astringent and wetting agents used. We have found that from this point of view zinc salts, particularly zinc sulfate, are to be preferred. Other zinc salts that may be used are the chloride and the acetate. In general, the quantity of astringent should be sufficient to give the desired coagulating action and the quantity of wetting agent should be sufficient to give an effective cleansing action but should not be so great as to kill the Doderlein bacilli. The solid compositions of the present invention are preferably compounded in such manner that when they are dissolved in water to the final dilution for use as a douche, the concentration of astringent is between 0.06 and 0.5% by weight of the solution and the quantity of wetting agent is between 0.00016% and 0.003% by weight of the solution. The quantity of wetting agent should not, of course, exceed that which can be dissolved without precipitation in a solution containing the astringent.

As pointed out above, it is desirable that the acidity of the solution be established and maintained at a value approximating that of the normal vagina. It has been found that when aluminum sulfate, ammonium alum, or potassium alum are used as astringents the desired acidity is usually produced by the aluminum salt itself, whereas when zinc salts are used it is desirable that a small quantity of an acid or acid salt be added to the composition to adjust the acidity of a pH between 3.0 and 6.0 and preferably to a value between 4.0 and 5.0. It has been found particularly desirable to adjust the acidity of the douche with a mixture of sodium citrate and sodium acid citrate that provides a buffering action which maintains the pH of the douche within the desired range. The desired acidity can also be obtained by using any of various common acids such as sulfuric, acetic, tartaric, citric, malic or lactic acids or acid salts of these acids.

In the case of a solution that is to come in contact with a permeable membrane such as that of the vaginal surface, it is desirable that the solution be approximately isotonic or perhaps somewhat hypertonic, i. e., that it contain a sufficient quantity of sodium chloride to produce a solution having a concentration equivalent to or somewhat greater than that of the normal body saline. Accordingly, the compositions of the present invention preferably include a quantity of sodium chloride such that when they are dissolved in water to the desired final dilution they contain that sodium chloride concentration which will make them at least approximately isotonic.

Various agents other than those previously mentioned may also be included in the solid compositions and solutions of the present invention to accomplish special purposes. In some cases it is desirable to add a conditioning agent such as lactose which favors the growth of the Doderlein bacilli. Also aromatic compounds such as menthol, oil of peppermint and the like may be included to render the product more agreeable in use.

In order to point out more fully the nature of the present invention, there are given below certain specific examples of the invention and its application in practical use and also certain modifications and alternatives. However, it should be understood that these are not intended to be exhaustive or to be limiting of the invention. On the contrary, these illustrations and the explanations herein are given in order to acquaint others skilled in the art with this invention and the principles thereof and a suitable manner of its application in practical use so that others skilled in the art may be enabled to modify the invention and to adapt it and to apply it in numerous forms each as may be best suited to the requirements of a particular use.

The examples given below are of solid compositions that may be dissolved in water to form a douche. These compositions when dissolved in water to the extent of 12 gms. per quart of water yield douche solutions that are substantially inactive toward Doderlein bacilli. As indicated above, the astringent content of the present douche solutions may vary from 0.06% to 0.5% by weight of the solution. However, not all of the following compositions can be used at all dilutions corresponding to the astringent range stated and still be inactive toward Doderlein bacilli. In order to avoid destruction of the Doderlein bacilli the following compositions should be used at dilutions such that the wetting agent concentration does not exceed about 1:30,000.

*Example 1*

Sodium lorolsulfoacetate (Nacconol LAL)
    0.013
Zinc sulfate monohydrate _____ 10.3
Lactose USP _____ 15.0
Sodium citrate USP _____ 10.0
Tartaric acid USP _____ 1.75
Color and aromatics q. s. a. d.
Sodium chloride USP _____ 62.5

*Example 2*

Sodium lorolsulfoacetate (Nacconol LAL)
    0.25
Zinc sulfate monohydrate _____ 10.3
Lactose USP _____ 10.0
Sodium citrate USP _____ 8.0

Monosodium citrate _____ 2.5
Color and aromatics q. s. a. d.
Sodium chloride USP _____ 68.9

*Example 3*

Sodium lorosulfoacetate (Nacconol LAL)
                                         0.25
Zinc sulfate monohydrate _____ 39.0
Sodium citrate USP _____ 8.0
Monosodium citrate _____ 2.5
Lactose USP _____ 5.0
Color and aromatics q. s. a. d.
Sodium chloride USP _____ 45.0

*Example 4*

Lorolalkyl metasodium sulfobenzoate (Santomerse B) _____ 0.25
Zinc sulfate monohydrate _____ 10.3
Lactose USP _____ 10.0
Sodium citrate USP _____ 8.0
Monosodium citrate USP _____ 2.5
Color and aromatics q. s. a. d.
Sodium chloride USP _____ 68.65

*Example 5*

Lorolalkyl metasodium sulfobenzoate (Santomerse B) _____ 0.25
Zinc sulfate monohydrate _____ 5.0
Lactose USP _____ 10.0
Sodium citrate USP _____ 8.0
Monosodium citrate _____ 2.5
Color and aromatics q. s. a. d.
Sodium chloride USP _____ 73.95

*Example 6*

Lorolalkyl metasodium sulfobenzoate _____ 0.25
Aluminum sulfate anhydrous _____ 7.6
Lactose USP _____ 12.0
Sodium citrate USP _____ 17.5
Citric acid anhydrous _____ 1.75
Color and aromatics q. s. a. d.
Sodium chloride USP _____ 60.65

*Example 7*

Lorolalkyl metasodium sulfobenzoate _____ 0.013
Zinc sulfate monohydrate _____ 10.3
Lactose USP _____ 15.0
Sodium citrate USP _____ 10.0
Tartaric acid USP _____ 1.75
Color and aromatics q. s. a. d.
Sodium chloride USP _____ 62.3

*Example 8*

Lorolalkyl metasodium sulfobenzoate _____ 0.25
Zinc sulfate monohydrate _____ 39.0
Sodium citrate USP _____ 8.0
Monosodium citrate _____ 2.5
Lactose USP _____ 8.0
Color and aromatics q. s. a. d.
Sodium chloride USP _____ 41.95

From the foregoing examples and description, it is apparent that the compositions of the present invention may be used to provide a douche that is non-toxic, free from irritating and deleterious components and has a beneficial effect on vaginal and other mucous membranes with which it comes in contact. As previously stated, the present compositions may be made up in the form of finely divided dry solids or in the form of concentrated solutions that may be diluted before being used. The solid compositions should, of course, contain no components that are insoluble in water and should dissolve completely in water to form a clear solution. The acidity of the solutions prepared in accordance with the present invention is established and maintained at pH 4.0 to 5.0 and there is thus no tendency for the solution to alter the normal vaginal acidity. The astringent and wetting agent cooperate in the manner previously described to penetrate the thickened mucous masses and thoroughly cleanse the surfaces of the vagina. The compositions are chemically and physically stable and may, if necessary, be stored over long periods of time without deterioration.

Since many embodiments might be made of the present invention and since many changes might be made in the embodiment disclosed herein, it is to be understood that the foregoing description is to be interpreted as illustrative only and not in a limiting sense.

We claim:

1. A composition adapted to be dissolved in water and used as a douche, said composition being a dry, finely divided solid capable of being dissolved in water to form a clear solution and comprising a non-toxic zinc salt as an astringent, a wetting agent which is sodium lorolsulfoacetate, and a quantity of an acidic substance sufficient to give said douche a pH of about 4.0 to 5.0.

2. A composition adapted to be dissolved in water and used as a douche, said composition being a dry, finely divided solid capable of being dissolved in water to form a clear solution and comprising a non-toxic water-soluble astringent selected from the group consisting of aluminum and zinc salts, a wetting agent which is sodium lorolsulfo acetate and a quantity of an acidic substance sufficient to give said douche a pH of about 4.0 to 5.0.

3. A douche comprising a clear water solution of a non-toxic astringent selected from the group consisting of aluminum and zinc salts and a wetting agent which is sodium lorolsulfo acetate, the pH of said douche solution being about 4.0 to 5.0 and the concentration of said wetting agent in said solution being less than 1:30,000.

4. A douche comprising a clear water solution of a non-toxic astringent selected from the group consisting of aluminum and zinc salts, a wetting agent which is sodium lorolsulfoacetate, said solution containing from 0.06% to 0.5% by weight of said astringent, from 0.00016% to 0.003% of wetting agent, and a quantity of an acidic substance sufficient to give said douche a pH of about 4.0 to 5.0.

5. A composition adapted to be dissolved in water and used as a douche, said composition being a dry, finely divided solid capable of being dissolved in water to form a clear solution and comprising a non-toxic water-soluble astringent selected from the group consisting of aluminum and zinc salts, a wetting agent which is sodium lorolsulfoacetate, and a quantity of a sodium citrate-sodium acid citrate buffer to maintain the pH of said solution at about 4.0 to 5.0.

JOHN H. WRIGHT.
ALBERT W. LEWING.

References Cited in the file of this patent

UNITED STATES PATENTS

| Number | Name | Date |
|---|---|---|
| 2,114,370 | Bickenheuser | Apr. 19, 1938 |
| 2,303,932 | Guild | Dec. 1, 1942 |
| 2,374,754 | Kreidl et al. | May 1, 1945 |
| 2,467,884 | Elias | Apr. 19, 1949 |

(Other references on following page)

FOREIGN PATENTS

| Number | Country | Date |
|---|---|---|
| 421,532 | Great Britain | Dec. 14, 1934 |

OTHER REFERENCES

Novak: Oral and Cut. Review, volume 50, page 80 (1946).

Karnaky: Southern Medical J., volume 30, January 1937, pages 69 to 70.

Harry: Manufacturing Chemist, November 1940, page 290.

Johnson et al.: Proc. Exp. Biol. and Med., volume 54, November 1943, pages 245 to 249.

Bliss: The Drug and Cosmetic Industry, June 1937, pages 806 to 809.

Becker et al.: Human Fertility, March 1944, page 8.

MacLeod: Human Fertility, December 1943, pages 116 to 117.

Voge: Chemistry and Physics of Contraceptives, 1933, page 259.